United States Patent
Brunsch et al.

(10) Patent No.: US 7,949,075 B2
(45) Date of Patent: May 24, 2011

(54) DATA SLICER CIRCUIT, DEMODULATION STAGE, RECEIVING SYSTEM AND METHOD FOR DEMODULATING SHIFT KEY CODED SIGNALS

(75) Inventors: Dietmar Brunsch, Hannover (DE); Alexander Thomas, Hannover (DE)

(73) Assignee: Alcatel Lucent, Paris (FR)

( * ) Notice: Subject to any disclaimer, the term of this patent is extended or adjusted under 35 U.S.C. 154(b) by 1071 days.

(21) Appl. No.: 11/736,578

(22) Filed: Apr. 17, 2007

(65) Prior Publication Data

US 2007/0248192 A1    Oct. 25, 2007

(30) Foreign Application Priority Data

Apr. 21, 2006 (EP) .................................. 06300389

(51) Int. Cl.
  *H04L 27/06*    (2006.01)
(52) U.S. Cl. ........................................................ 375/340
(58) Field of Classification Search .................. 375/316, 375/322, 323, 324, 325, 326, 329, 334, 340, 375/342, 259, 268, 269, 271–274, 279, 354, 375/359, 360; 329/300, 303, 304, 310
See application file for complete search history.

(56) References Cited

U.S. PATENT DOCUMENTS

| 4,335,354 | A | 6/1982 | Crandall et al. |
| 6,985,541 | B1 | 1/2006 | Luff |
| 2003/0198302 | A1* | 10/2003 | Song .............................. 375/340 |
| 2004/0190650 | A1 | 9/2004 | Khorram et al. |
| 2005/0220226 | A1 | 10/2005 | Zhang et al. |

FOREIGN PATENT DOCUMENTS

GB        2310331 A        8/1997

* cited by examiner

*Primary Examiner* — David C. Payne
*Assistant Examiner* — Vineeta S Panwalkar
(74) *Attorney, Agent, or Firm* — Fay Sharpe LLP

(57) ABSTRACT

The invention relates to a data slicer circuit for processing a voltage signal input having two voltage values, each value representative of a value assigned to one characteristic of a modulated baseband carrier signal corresponding to a binary one or zero bit of information, the data slicer comprising first means for detecting a rising transition segment of the voltage signal, first means for detecting a falling transition segment of the voltage signal, means for providing a first serial digital signal output with a binary zero value if a rising transition segment of the voltage signal is detected or a binary one value if a falling transition segment of the voltage signal is detected or vice versa.

16 Claims, 4 Drawing Sheets

A

--Prior Art--

B

--Prior Art--

US 7,949,075 B2

DATA SLICER CIRCUIT, DEMODULATION STAGE, RECEIVING SYSTEM AND METHOD FOR DEMODULATING SHIFT KEY CODED SIGNALS

BACKGROUND OF THE INVENTION

The invention is based on a priority application EP 06300389.1 which is hereby incorporated by reference.

The present invention relates generally to serial data transmission using shift keying coded signals and more particularly to a data slicer circuit, a demodulation stage, a receiving system and a method for the reception of shift-keying coded data streams.

Serial data transmission is a generally known transmission technique used for the transmission of digital data, e.g. applicable in LAN or internet networks or mobile phone services. Depending on the transmission media i.e. electric, optical or radio, using wired or wireless connections, and to avoid undesired attenuation and signal interference effects, the digital signal to be transmitted is usually encoded by varying some parameters of a carrier signal, typically a sinusoidal signal, which is known as modulation. Basic well known digital modulation techniques for serial data transmission are amplitude-shift keying (ASK), frequency-shift keying (FSK) and phase-shift keying (PSK). FSK, for example, is a way of transmitting a data stream by changing the frequency of the carrier signal in accordance with the digital values of the data stream.

In a conventional digital communication system e.g. using FSK modulation, a receiving system has a demodulation stage DM, as shown in FIG. 1A, comprising a discriminator D capable of detecting (or discriminating between) the two frequencies of a baseband signal S, and producing an output voltage AF that is directly related to the frequency of the received signal. This is sometimes known as a frequency-to-voltage conversion. The output voltage signal AF of the discriminator, shown in FIG. 1B, provides values V1 and V0, where V1 is a voltage representative of the frequency f1 of the carrier signal for encoding a binary one and V0 is a voltage representative of the frequency f0 of the carrier signal for encoding a binary zero. There are numerous known techniques for providing a frequency-to-voltage conversion function, and the present invention is not intended to be limited to any such FM demodulation implementations.

Although the output voltage signal AF shown in FIG. 1B has been explained as having a substantially stable horizontal diagram characteristic with values V1 and V0 having substantially the same voltage, it is also possible that this output voltage signal AF presents non-horizontal diagram characteristic and/or non-stable phases and the values of V1 and V0 be substantially different every bit.

The discriminator D is followed by a so-called data slicer DS, which receives the output voltage signal AF and provides a digital data stream output corresponding to the originally bit stream sent by the transmitter. The data slicer DS usually comprises a peak/valley detector or charge/discharge circuit connected to a comparator circuit which provides a binary one when the magnitude of the voltage output AF exceeds a slicing point, and a binary zero when said magnitude is below the slicing point. A known receiver system comprising a demodulation stage with the elements described above is disclosed in U.S. Patent Application 2004/0190650. Further, conventional receiving systems also comprise a power detector circuit PD which provides an indication RSSI, typically a DC voltage, of the baseband signal S strength at the input of the discriminator D. Low power intermediate frequency (IF) receiver circuit RX3141 for wireless radio serial data transmission using FSK modulation from HiMARK Technology, Inc. is also a known example of a conventional demodulation stage comprising the elements described above (a quadrature FM detector as discriminator, a charge/discharge circuitry and a 1-bit comparator as data slicer and which provides also an indication of the received signal strength RSSI at the input of the discriminator).

Although explained for a digital communications system using FSK modulation, the same principles apply for an ASK or PSK modulation in which the discriminator provides an output voltage AF that is directly related to the amplitude or the phase of the received signal.

A problem with the known type of serial data receiving systems is that the data slicer is not adequate for reception from the first bit, that is, a bit preamble prior to the data stream transmitted is needed in order to put the receiver into stable operation. This is needed in said prior art receiving systems in order to obtain an stable output voltage signal AF with stable absolute peak and valley voltage values and an stable average voltage value which is used as reference for the slicing comparator. Further, the data slicer of the known receiving systems is either designed for reception of continuous bit changes or for large strings of bits of the same polarity to avoid increase of errors due to noise.

SUMMARY OF THE INVENTION

It is the object of the present invention to provide a receiver system for the demodulation of shift-keyed modulated data streams, using FSK, ASK or PSK modulation or the like, which provides a fast demodulation response from the first bit.

The object is achieved by a data slicer circuit for processing a voltage signal input having two voltage values, each value representative of a value assigned to one characteristic of a modulated baseband carrier signal corresponding to a binary one or zero bit of information, the data slicer comprising first means for detecting a rising transition segment of the voltage signal, first means for detecting a falling transition segment of the voltage signal, and means for providing a first serial digital signal output with a binary zero value if a rising transition segment of the voltage signal is detected or a binary one value if a falling transition segment of the voltage signal is detected or vice versa.

This object is further achieved by a demodulation stage for shift-keyed coded signals comprising a discriminator which provides a voltage signal having two voltage values, each value representative of a value assigned to one characteristic of a modulated baseband carrier signal corresponding to a binary one or zero, and a data slicer circuit for processing a voltage signal input having two voltage values, each value representative of a value assigned to one characteristic of a modulated baseband carrier signal corresponding to a binary one or zero bit of information, the data slicer comprising first means for detecting a rising transition segment of the voltage signal, first means for detecting a falling transition segment of the voltage signal, and means for providing a first serial digital signal output with a binary zero value if a rising transition segment of the voltage signal is detected or a binary one value if a falling transition segment of the voltage signal is detected or vice versa.

This object is further achieved by a receiving system for shift keying coded signals comprising a demodulation stage for shift-keyed coded signals comprising
- a discriminator which provides a voltage signal having two voltage values, each value representative of a value assigned to one characteristic of a modulated baseband carrier signal corresponding to a binary one or zero, and
- a data slicer circuit for processing a voltage signal input having two voltage values, each value representative of a value assigned to one characteristic of a modulated baseband carrier signal corresponding to a binary one or zero bit of information, the data slicer comprising
- first means for detecting a rising transition segment of the voltage signal,
- first means for detecting a falling transition segment of the voltage signal, and
- means for providing a first serial digital signal output with a binary zero value if a rising transition segment of the voltage signal is detected or a binary one value if a falling transition segment of the voltage signal is detected or vice versa.

This object is further achieved by a method for demodulating shift keyed coded signals, comprising the steps of:
- providing a voltage signal having two voltage values, each value representative of a value assigned to one characteristic of a modulated baseband carrier signal corresponding to a binary one or zero bit of information,
- detecting a rising transition segment of the voltage signal,
- detecting a falling transition segment of the voltage signal, and
- providing a first serial digital signal output with a binary zero value if the rising transition segment of the voltage signal is detected or a binary one value if the falling transition segment of the voltage signal is detected or vice versa.

The receiving system according to the invention comprises a demodulation stage in which a discriminator produces a voltage output having two voltage values, each value representative of a value assigned to one characteristic of the modulated carrier signal e.g. amplitude, frequency or phase, corresponding to a binary one or zero, and said voltage output being processed by a data slicer module which provides fast serial digital data output corresponding to the data stream sent by the transmitter side.

The receiving system according to the invention provides fast serial digital data output response e.g. less than 10% of the bit length, reception from the first bit i.e. without the need for a short data preamble, and is designed for reception of both data streams with continuous bit changes or for large strings of bits of the same polarity.

The basic idea behind the invention is that there is no need to wait for the stabilization of the output voltage signal AF in order to provide the desired serial data output and thus no need for the transmitter to send a plurality of data preamble bits for allowing stabilization of the data slicer detection circuit. According to our invention the rising and falling edges of the output voltage signal AF are detected, independently of the absolute V1 and V0 signal values and/or a substantially stable horizontal diagram characteristic and average value of the voltage signal. By applying the receiving system and receiving method for demodulating shift-keyed coded signals according the invention then serial data transmission throughput between transmitter and receiver can be increased and thus increasing the system performance.

Further advantageous configurations of the invention emerge from the dependent claims, the following description and the drawings.

BRIEF DESCRIPTION OF THE DRAWINGS

In a preferred embodiment of the invention the receiving system comprises a demodulation stage in which the data slicer also comprises noise removal means which eliminate digital noise in case of no signal or long high or low periods of the received data stream. This is needed for example when the sensibility of the rising edge and falling edge detectors are adjusted to detect small amounts of voltage difference. In case of an ideal output voltage signal AF without noise peaks these noise removal means are not needed.

An embodiment example of the invention is now explained with the aid of FIGS. 1 to 6.

DETAILED DESCRIPTION OF THE DRAWINGS

Figure 2:
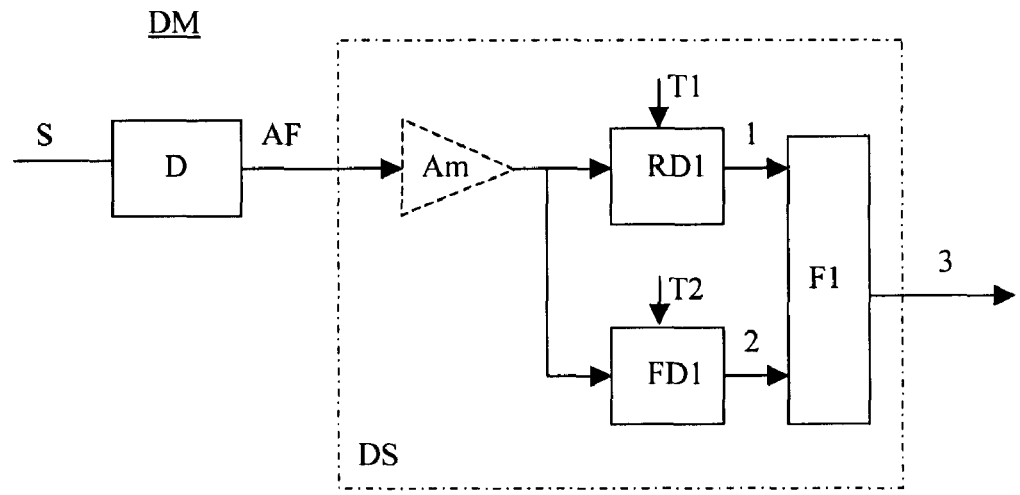
FIG. 2 shows a block diagram of a first example of a demodulation stage of a receiving system according to the invention.

FIG. 2 is a first embodiment of a demodulation stage DM of a receiver system according to the invention with signal S, discriminator module D, voltage signal AF, data slicer DS, amplifier Am, rising edge detector RD1, falling edge detector FD1, time parameters T1 and T2, falling edge and rising edge detector signal outputs 1 and 2, logical block F1 and data output signal 3.

Figure 1:
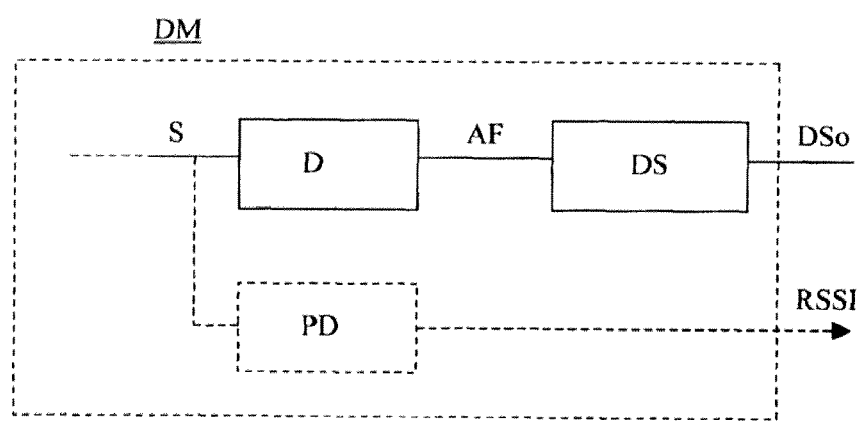
FIGS. 1A, B schematically show a block diagram of a demodulation stage of a conventional serial data receiving system and a diagram of a signal at the output of a discriminator module.
Figure 1:
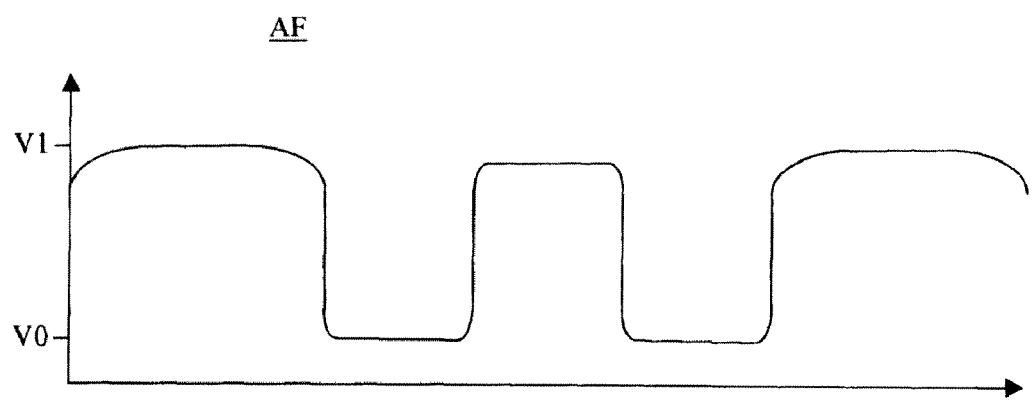

The signal S is the received carrier signal modulated using FSK, ASK or PSK techniques which has been adapted in the receiver system to baseband form. The discriminator D detects a modulated characteristic of the carrier signal, e.g. amplitude, frequency or phase, and produces voltage output signal AF which is directly related to the value of the modulated characteristic of the carrier signal S and having a form as shown in FIG. 1B. As already explained above, for a FSK modulated data stream, the voltage output signal AF may be the result of a frequency-to-voltage conversion performed by a conventional FM demodulator.

Voltage signal AF is then processed by the data slicer DS according to the invention. The data slicer DS may comprise amplifier Am to amplify the voltage signal AF, but the presence of this element in the input path of the data slicer is optional and not necessary. Rising transitions in the voltage signal AF will be interpreted by the rising edge detector RD1 and falling transitions in the voltage signal AF will be interpreted by the falling edge detector FD1. Time parameters T1 and T2 represent the time used to hold a rising or falling detection signal indication provided by said edge detectors, that is, the time a rising edge detection indication or falling edge detection indication is maintained at the output of the rising or falling edge detectors. Said time parameters T1 and T2 are set to a value which is less than one bit, said bit time period being derived from the modulation used and the maximum transmission data rate as is known in the art.

The output signals 1 and 2 of the rising edge detector RD1 and the falling edge detector FD1 are received by logical block F1 which provides a binary one on output 3 if the rising edge detector RD1 provides a rising edge detection indication on output 1 during time T1, or provides a binary zero on output 3 if the falling edge detector FD1 provides a falling edge detection indication on output 2 during time T2. An example implementation of logic block F1 could be for example a RS-Flip-Flop with set input connected to the output signal 1 of the rising edge detector RD1 and reset input connected to the output signal of the falling edge detector FD1.

Figure 3:
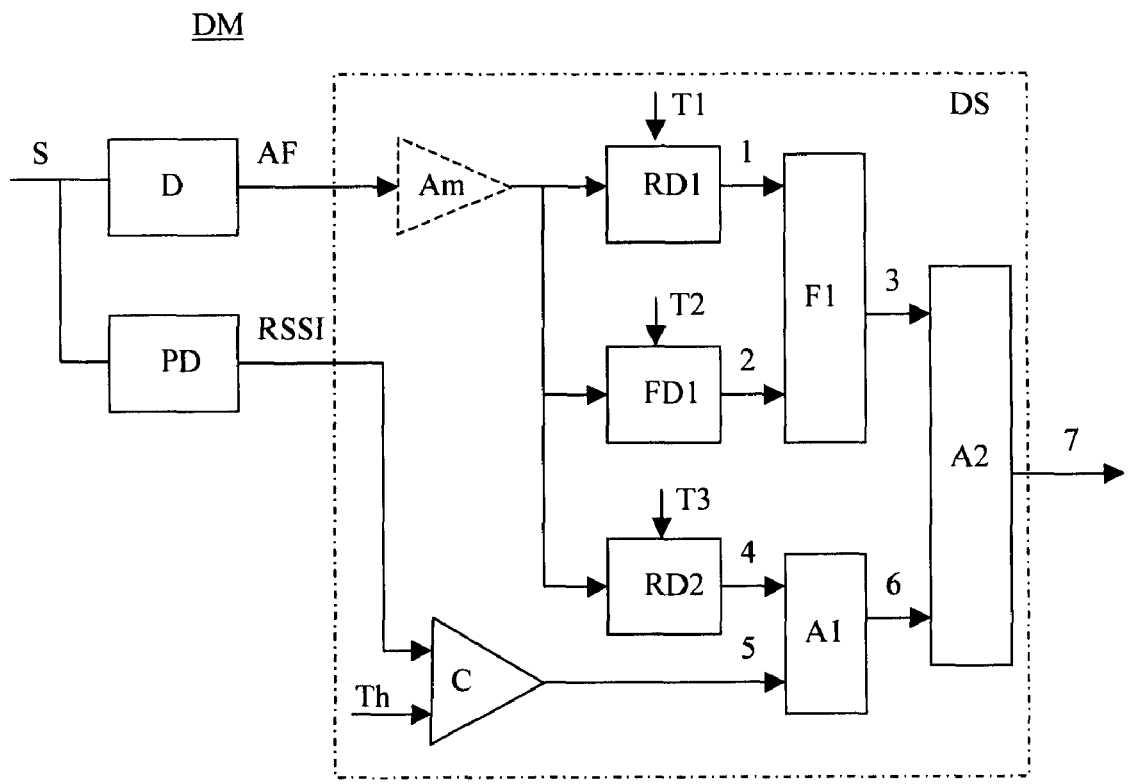
FIG. 3 shows a block diagram of a second example of a demodulation stage of a receiving system according to the invention.

FIG. 3 is a second embodiment of a demodulation stage DM of a receiver system according to the invention with signal S, discriminator module D, voltage signal AF, power detector PD, received signal strength indication RSSI, data slicer DS, amplifier Am, first rising edge detector RD1, falling edge detector FD1, second rising edge detector RD2, time parameter values T1 to T3, falling edge and rising edge detector signal outputs 1, 2, 4, 5, logical blocks F1, A1 and A2, comparator C, threshold value Th, output signal 5 of the comparator C, output signals 3 and 6 of the logical blocks F1 and A1 and data output signal 7.

Apart from the elements already described in FIG. 2 above, the demodulation stage DM provides also an indication RSSI, typically a DC voltage, of the strength of the signal S at the input of the discriminator D. The indication RSSI may be provided by using conventional power detectors PD.

The data slicer DS according to the invention further comprises a second rising edge detector RD2 which together with the comparator C provide error reduction for noisy voltage signals AF a) in case that there is no signal S to be demodulated and/or b) in case of the signal S having large strings of bits of the same polarity. The comparator C is used to compare the signal strength indication RSSI with a threshold value Th which is set to a value greater than the noise value which has to be eliminated. If the signal strength indication RSSI is greater than said threshold value Th the output signal 5 of the comparator C provides and indication e.g. a high logical-one value, which indicates that there is presence of a signal S which shall be demodulated. In case the signal strength indication RSSI is lower than the threshold value Th the output signal 5 of the comparator C provides an indication e.g. a low logical-zero value, which indicates that there no presence of a signal S which shall be demodulated and there is only noise. The second rising edge detector RD2 is in charge of detecting the rising edge of the voltage signal AF and provides a detection indication on output 4 for a certain time defined by the time parameter value T3, which is set to a value of greater than one bit of the transmitted data stream, said bit time value being derived from the modulation used and the maximum transmission data rate as is known in the art. The second rising edge detector RD2 provides protection for the case that one transmitter stacks to a digital high or low bit stream for longer than a typical telegram length or maximum serial data transmission unit. Taking this value twice is a good estimation for T3. The output signal 4 of the second rising edge detector RD2 and the output signal 5 of the comparator C are connected to logical block A1 in charge of analyzing both comparator and rising edge detection indications. The output signal 6 of the logical block A1 works as a switch for output signal 3 of the logical block F1 in connection with logical block A2. When the output signal 4 of the second rising edge detector RD2 indicates that a rising edge transition of voltage signal AF has been detected and the output signal 5 of the comparator C indicates that there is presence of a signal S which shall be demodulated, then the output signal 6 of logical block A1 provides an indication e.g. a high logical-one value, indicating that the output signal 3 of the logical block F1 shall be provided as the data output signal 7. On the other hand, when there is no presence of a rising edge transition detection signal at the output 4 of the second rising edge detector RD2 or the comparator C indicates that there is no signal to be demodulated, then the output signal 6 of logical block A1 provides an indication e.g. a low logical-zero value, indicating that the output signal 3 of the logical block F1 shall be blocked and that the data output signal 7 shall be maintained to a low logical-zero value. Logical block A2 is in charge of receiving output signal 3 of logical block F1 and providing said output signal 3 as the data output signal 7 according to signal indication 6 of logical block A1 as explained above. An example implementation of logical blocks A1 and A2 could be a logical AND circuit.

Figure 4:
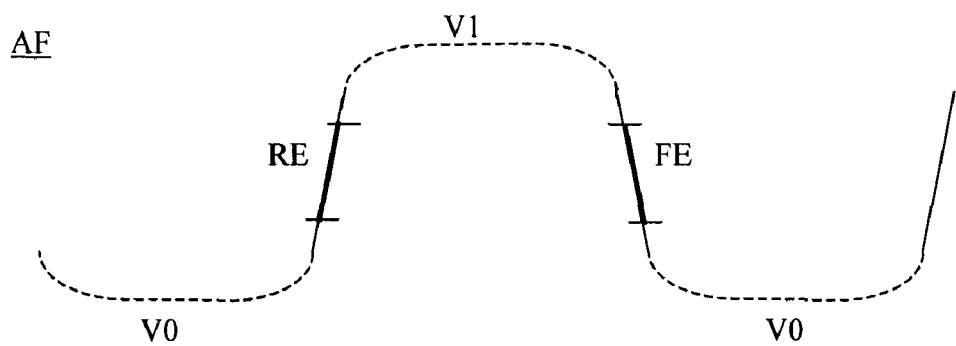
FIG. 4 shows the basic principle behind the invention with the aid of a signal diagram of the voltage signal at the output of a shift-keyed coded signal discriminator.

FIG. 4 shows a diagram of the output voltage signal AF of a shift-keyed coded signal discriminator with a voltage value V0 representative e.g. of a first frequency f0 of the carrier signal for encoding a binary zero, a voltage value V1 representative e.g. of a second frequency f1 of the carrier signal for encoding a binary one, and a rising edge transition segment RE and a falling edge transition segment FE representative of a certain rising or falling voltage difference of the output voltage signal AF.

The rising edge transition segment RE and the falling edge transition segment FE of the output voltage signal AF is detected by the data slicer circuit according to the invention. The voltage difference for detection of said transition segments RE, FE may be adjusted as desired, that is, the sensibility of the rising and falling edge detectors, for detection of said rising or falling output voltage signal difference, may be adjusted as needed. Alternatively, the sensibility of the rising and falling edge detectors may be fixed to a certain voltage level difference and the gain of the amplifier Am be adjusted to provide said voltage difference needed by the rising and falling edge detectors.

Figure 5:
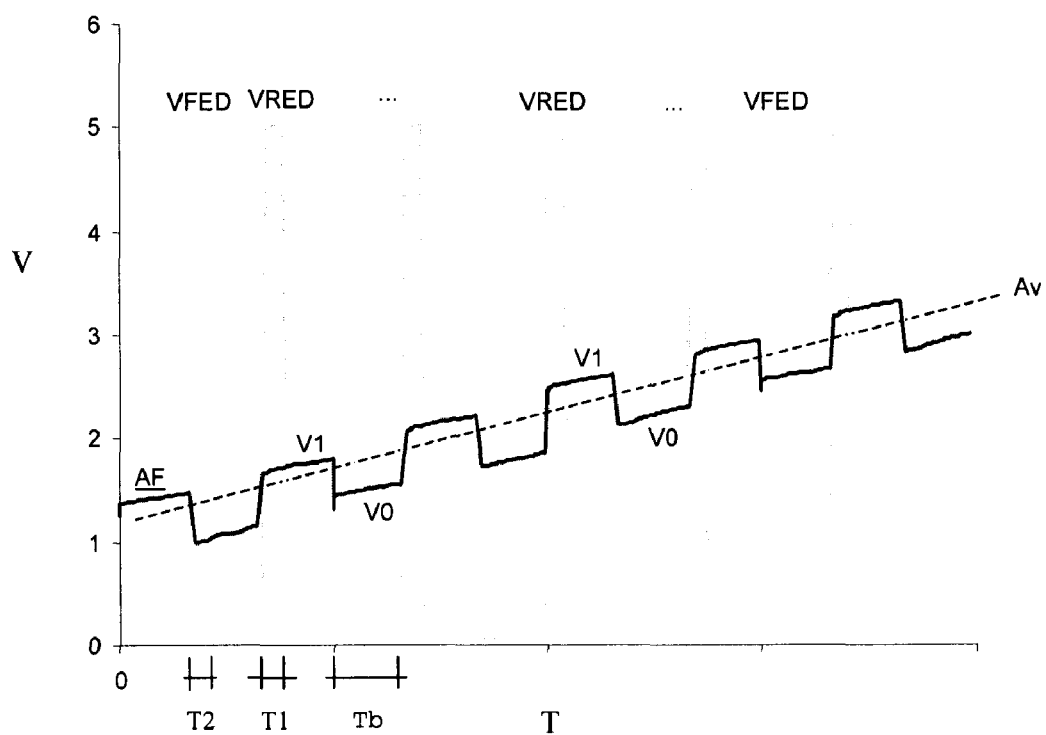
FIG. 5 shows the functionality of the rising and falling edge detectors with the aid of a signal diagram of the voltage signal at the output of a shift-keyed coded signal discriminator.

FIG. 5 shows a voltage V-time T diagram of the output voltage signal AF of a shift-keyed coded signal discriminator with a voltage value V0 representative e.g. of a first frequency f0 of the carrier signal for encoding a binary zero, a voltage value V1 representative e.g. of a second frequency f1 of the carrier signal for encoding a binary one. The voltage values V0 and V1 do not have the same absolute value for every bit of information time Tb, which may happen for example when the output voltage signal AF is not in a stable phase or the discriminator does not provide a fixed or stable output voltage signal average value Av. The rising edge detector detects rising edge transition segments of the output voltage signal AF as explained in FIG. 4 and provides an indication of said detection by holding a voltage value VRED during a certain time T1 at its output. The falling edge detector detects falling edge transition segments of the output voltage signal AF as explained in FIG. 4 and provides an indication of said detection by holding a voltage value VFED during a certain time T2 at its output. The rising and falling edge detection indications holding times T1 and T2 are set to be less than one bit period Tb.

As explained in the examples of FIGS. 2 and 3 the rising and falling edge detection indications are provided to a logical block F1 in charge of analyzing said indications according to the way the output voltage signal AF is obtained e.g. value V0 means a binary zero and value V1 means a binary one or vice versa. For example, logical block F1 may provide a binary one on output 3 if the rising edge detector RD1 provides a rising edge detection indication on output 1, or provide a binary zero on output 3 if the falling edge detector FD1 provides a falling edge detection indication on output 2. It is understood that, if the output voltage signal AF is encoded so that value V0 means a binary one and value V1 means a binary zero, then logical block F1 may provide a binary one on output 3 if the falling edge detector FD1 provides a falling edge detection indication on output 2 or provide a binary zero on output 3 if the rising edge detector RD1 provides a rising edge detection indication on output 1.

Figure 6:
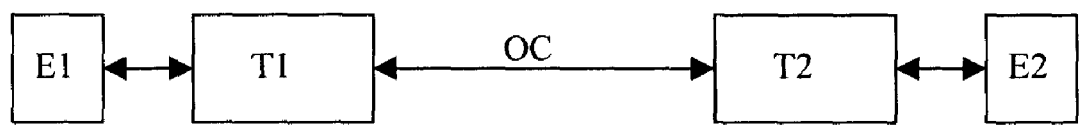
FIG. 6 is a block diagram illustrating a digital communications system with transceivers according to the invention.

FIG. 6 illustrates an exemplary implementation of a digital communications system with transceivers TR1 and TR2 according to the invention. Elements E1 and E2, such as base stations, antenna equipment or any other electromagnetic radiating element transmit/receive information to/from each other. Said information is modulated/demodulated for transmission/reception purposes by transceivers TR1 and TR2 and transmitted through a certain medium such as an optical fiber OC Transceivers TR1 and TR2 use any of the known shift-keying modulation techniques and the receiver system of the transceivers comprise a demodulation stage according to the invention in order to demodulate the shift-keyed coded signals. Although the transceivers TR1 and TR2 have been depicted as blocks not belonging to the elements E1 and E2 one skilled in the art will also understand that any of the transceivers TR1 and TR2 according to the invention may be implemented as part of the elements E1 and E2.

For the sake of generalization, it shall be understood that the principles of the invention apply to demodulator stages for shift-keyed coded data streams in which a discriminator module provides a voltage output directly related to one characteristic of the received baseband carrier signal which can be processed by a data slicer according to the invention and provide a digital data stream output.

It is also understood that one of average skill in the art will appreciate that the demodulator stage DM according to the invention may be implemented using one or more integrated circuits. The data slicer DS according to the invention may also be implemented using a processing device such as microprocessor, digital signal processor or any device that manipulates signals based on operational instructions. It is also clear that some of the functions of the demodulator stage DM may not be implemented inside the integrated circuit, for example time parameter values T1, T2 and T3 may be realized by connecting a resistor-capacitor combination to an integrated circuit, and the rising edge and falling edge detectors RD1, RD2, FD1 may be implemented as external retrigerable mono-stabile multivibrators configured accordingly. Further, the skilled in the art would understand that the processing logic can be inverted and the rising and falling edge detectors interchanged. It is also possible that all or part of the signals treated or processed in the demodulation stage according to the invention are digitalized and/or the rising and/or falling edge indications take the form of a digital word or character.

The invention claimed is:

1. A Data slicer circuit for processing a voltage signal input having two voltage values, each value representative of a value assigned to one characteristic of a modulated baseband carrier signal corresponding to a binary one or zero bit of information, the data slicer comprising
   first means for detecting a rising transition segment of the voltage signal,
   first means for detecting a falling transition segment of the voltage signal, and
   means for providing a first serial digital signal output with a binary zero value if a rising transition segment of the voltage signal is detected or a binary one value if a falling transition segment of the voltage signal is detected or vice versa,
   wherein the first means for detecting the rising transition segment of the voltage signal provides a rising transition detection indication during a first time interval less than one bit period,
   wherein the first means for detecting the falling transition segment of the voltage signal provides a falling transition detection indication during a second time interval less than one bit period,
   wherein the means for providing a first serial digital signal output comprises a means for analyzing the rising and falling transition detection indications and providing said first serial digital signal output according to the rising and falling transition detection indications.

2. The data slicer circuit of claim 1 further comprising voltage signal amplifying means prior to the first means for detecting the rising and falling transition segments of the voltage signal.

3. The data slicer circuit of claim 1, wherein the first means for detecting the rising transition segment and the first means for detecting the falling transition segment provides the rising transition detection indication and the falling transition detection indication independently of an absolute value of the voltage signal.

4. The data slicer circuit of claim 1, wherein the means for providing the first serial digital signal output provides the first serial digital signal output without needing a data preamble.

5. The data slicer circuit of claim 1, wherein the first means for detecting the rising transition segment and the first means for detecting the falling transition segment provides the rising transition detection indication and the falling transition detection indication independently of an average value of the voltage signal.

6. A Data slicer circuit for processing a voltage signal input having two voltage values, each value representative of a value assigned to one characteristic of a modulated baseband carrier signal corresponding to a binary one or zero bit of information, the data slicer comprising:
   first means for detecting a rising transition segment of the voltage signal,
   first means for detecting a falling transition segment of the voltage signal, and
   means for providing a first serial digital signal output with a binary zero value if a rising transition segment of the voltage signal is detected or a binary one value if a falling transition segment of the voltage signal is detected or vice versa,
   second means for detecting the rising transition segment of the voltage signal and providing a second rising transition detection indication during a third time interval greater than a maximum serial data transfer unit period,
   means for comparing a modulated baseband carrier signal strength indication with a predetermined threshold value and providing an indication corresponding to the result of said comparison,
   means for receiving said second rising transition detection indication and said signal strength comparison indication and providing a blocking or transfer signal output indication according to said input indications, and
   means for receiving the first serial digital signal output and the blocking or transfer signal output indication and providing a second serial digital signal output which is the first serial digital signal output when the blocking or transfer signal output indication indicates transfer and which is a fixed logical value when the blocking or transfer signal output indication indicates blocking.

7. The data slicer circuit of claim 6, wherein the indication indicates whether a signal is present for demodulation according to the comparison.

8. Demodulation stage for shift-keyed coded signals comprising
a discriminator which provides a voltage signal having two voltage values, each value representative of a value assigned to one characteristic of a modulated baseband carrier signal corresponding to a binary one or zero, and
a data slicer circuit according to claim 1.

9. A demodulation stage for shift-keyed coded signals comprising
a discriminator which provides a voltage signal having two voltage values each value representative of a value assigned to one characteristic of a modulated baseband carrier signal corresponding to a binary one or zero, and further comprising
a power detector circuit which provides a modulated baseband carrier signal strength indication, and
a data slicer circuit according to claim 6.

10. A Receiving system for shift keying coded signals comprising the demodulation stage according to claim 8.

11. A Method for demodulating shift keyed coded signals, comprising:
providing a voltage signal having two voltage values, each value representative of a value assigned to one characteristic of a modulated baseband carrier signal corresponding to a binary one or zero bit of information,
detecting a rising transition segment of the voltage signal,
detecting a falling transition segment of the voltage signal,
providing a first serial digital signal output with a binary zero value if the rising transition segment of the voltage signal is detected or a binary one value if the falling transition segment of the voltage signal is detected or vice versa,
providing a modulated baseband carrier signal strength indication,
detecting the rising transition segment of the voltage signal and providing a rising transition detection indication during a time interval greater than a maximum serial data transfer unit period,
comparing a modulated baseband carrier signal strength indication with a predetermined threshold value and providing an indication corresponding to the result of said comparison,
analyzing the rising transition detection indication during said time interval and said signal strength comparison indication and providing a blocking or transfer signal output indication according to said input indications, and
receiving the first serial digital signal output and the blocking or transfer signal output indication and providing a second serial digital signal output which is the first serial digital signal output when the blocking or transfer signal output indication indicates transfer and which is a fixed logical value when the blocking or transfer signal output indication indicates blocking.

12. The method of claim 11 further comprising the step of amplifying the voltage signal prior to the detection of the rising and falling transition segments of said signal.

13. The method of claim 11, wherein detecting the rising transition segment of the voltage signal includes providing a rising transition detection indication during a first time interval less than one bit period,
wherein detecting the falling transition segment of the voltage signal includes providing a falling transition detection indication during a second time interval less than one bit period.

14. The method of claim 13, wherein detecting the rising transition segment and detecting the falling transition segment includes providing the rising transition detection indication and the falling transition detection indication independently of an absolute value of the voltage signal.

15. The method of claim 11, wherein the first serial digital signal output is provided without a data preamble.

16. The data slicer circuit of claim 13, wherein detecting the rising transition segment and detecting the falling transition segment provides the rising transition detection indication and the falling transition detection indication independently of an average value of the voltage signal.

* * * * *